United States Patent [19]

Wrasidlo

[11] 3,816,303
[45] June 11, 1974

[54] POLY (N-AMIDO) IMIDES AS SEMIPERMEABLE MEMBRANES

[75] Inventor: Wolfgang J. Wrasidlo, La Mesa, Calif.

[73] Assignee: The United States of America as represented by the Secretary of the Interior, Washington, D.C.

[22] Filed: Dec. 20, 1972

[21] Appl. No.: 316,935

[52] U.S. Cl.................. 210/23, 210/321, 210/500, 260/78 TF, 260/30.2
[51] Int. Cl........................................... B01d 13/00
[58] Field of Search..................... 210/23, 321, 500; 260/78 TF, 30.2

[56] References Cited
UNITED STATES PATENTS

| | | | |
|---|---|---|---|
| 3,179,614 | 4/1965 | Edwards | 260/30.2 |
| 3,360,502 | 12/1967 | Loncrinio | 260/78 |
| 3,595,971 | 7/1971 | Behr | 260/78 TF |
| 3,719,640 | 3/1973 | Lee | 260/78 TF |
| 3,723,380 | 3/1973 | Dobinson | 260/78 TF |

OTHER PUBLICATIONS

Journal of Polymer Science, Vol. 3, pp. 679–683 (1965). Terunobu Unishi, Prep. of Aromatic Polyimide–Amide.

Primary Examiner—Frank A. Spear, Jr.
Assistant Examiner—Ferris H. Lander
Attorney, Agent, or Firm—William S. Brown; Frank A. Lukasik

[57] ABSTRACT

Semipermeable membranes are prepared from poly(N-amido)imides, i.e., polymers characterized by the recurring structural group

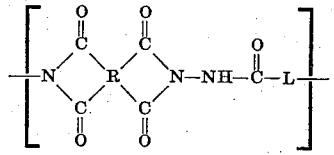

where R is a tetravalent organic radical and L is a divalent organic radical.

8 Claims, No Drawings

POLY (N-AMIDO) IMIDES AS SEMIPERMEABLE MEMBRANES

Reverse osmosis has attracted considerable interest in the field of purification of saline water. In this process, a pressure in excess of the osmotic pressure of the saline water feed solution is applied to the solution separated from purified water by a semipermeable membrane. Pure water is thereby caused to diffuse through the membrane, while the salt molecules or other impurities are retained by the membrane.

Efficiency of the reverse osmosis process depends to a large extent on the nature of the membrane and numerous types of membranes and methods of preparing them have been described in the prior art, e.g., in U.S. Pat. Nos. 3,133,132; 3,344,214; 3,412,184; 3,439,074; 3,472,766; 3,483,282; 3,497,451; 3,551,331 and 3,567,632. These membranes are commonly cast from a solution of the membrane material in water or an organic solvent, with or without additional solution components such as swelling agents, etc. The membranes may be employed in the reverse osmosis process in the form of a free film or a film deposited on a porous support material.

It has now been found that semipermeable membranes consisting essentially of poly(N-amido)imides exhibit superior salt rejection and water flux in reverse osmosis processes. The novel poly(N-amido)imides of the invention are characterized by a recurring unit having the formula:

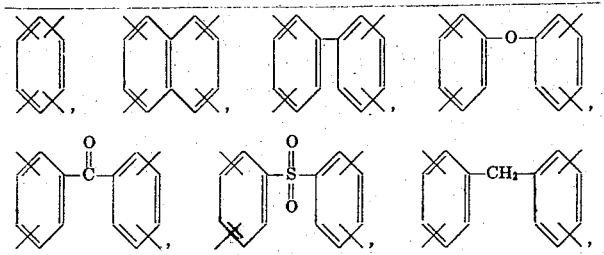

where R is a tetravalent organic radical and L is a divalent organic radical. R is preferably a tetravalent aromatic radical such as the following:

etc. It may, however, also be an alicyclic or heterocyclic radical such as:

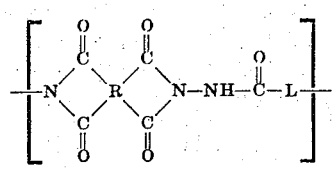

etc.

L is preferably an amido group, i.e., —CONH—, or a substituted amido group such as —R'CONH— where R' is a divalent aliphatic or aromatic radical having about one to 18 carbon atoms. L may, however, also be a divalent aromatic or aliphatic radical such as ortho, meta or paraphenylene.

The poly(N-amido)imides of the invention are prepared by reactions of the type conventionally employed in preparation of imides. This involves initial reaction of a tetracarboxylic acid dianhydride with an amidohydrazide to form a polyamic acid, and subsequent dehydration to form the corresponding poly(N-amido)imide. The overall reaction is represented by the following general equation:

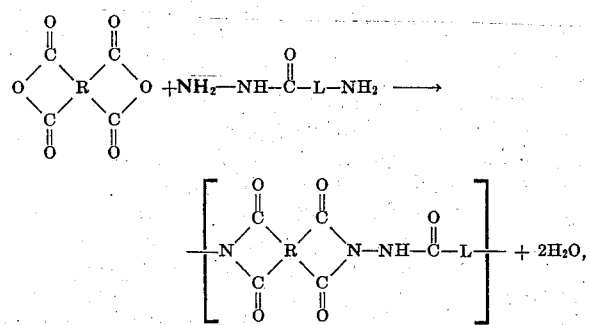

where R and L are as defined above.

The reactions are carried out in conventional solvents such as dimethylacetamide (DMAc), dimethylformamide (DMF), dimethylsulfoxide (DMSO), ethyl iodide, methyl pyrrolidone, pyridine or 2-pyrrollidone. Suitable reaction temperatures for preparation of the polyamic acids will generally vary from about 0° to 25°C, with the optimum temperature depending on the particular reactants, molecular weight of the product, etc. Generally, ambient conditions of temperature, as well as pressure, are satisfactory, although a lower temperature, e.g., about zero to 15°C may improve efficiency of the reaction in some cases.

Stoichiometric amounts of the reactants are usually satisfactory, with concentrations of reactants in the solvent being about 10 to 25 percent. The order of mixing and means for mixing the reactants and solvent are not critical; however, a slow addition of the hydrazide to a solution of the anhydride in the solvent has generally been found to give polyamic acids of desirably high molecular weight. The polyamic acid generally has a weight average molecular weight of about 20,000 to 100,000.

Conversion of the polyamic acid to the corresponding polyimide may be achieved by heating the solution of the polyamic acid at a temperature of about 100° to 200°C for a period of about 5 minutes to 24 hours. This is most readily accomplished by heating a cast film of the solution to a temperature of about 135° to 160°C for about 1 to 2 hours. Alternatively, the conversion may be accomplished by means of chemical dehydration, e.g., by treatment of the solution with a mixture of 50 volume percent pyridine in acetic anhydride.

A percent conversion to polyimide of about 60 to 70 will normally be desirable, since a relatively high degree of imidization is usually required to provide membranes having high salt rejections and high mechanical stability under reverse osmosis conditions. Molecular weights of the resulting imide polymers will generally range from about 10,000 to 80,000.

Semipermeable membranes may be prepared from the poly(N-amido)imides of the invention by means of conventional procedures. Dense, permselective membranes in thin film form, ranging from about 1 to 50 microns in thickness, may be obtained by heating casting dope on glass plates to temperatures ranging from about 40° to 200°C for a period of about 5 minutes to 24 hours. The casting dopes consist of a solution of about 10 to 20 weight percent of the polymer in solution in a suitable solvent. Generally, any of the solvents employed in preparation of the polymer may be used in preparation of the dopes, with DMAc or pyridine generally being preferred. The dopes may also contain modifiers such as metallic salts (i.e. $CaCl_2$, LiCl, etc.) or nonsolvents such as betanes or alcohols. The thus prepared films may be used as such, or on a suitable support material.

Ultrathin film membranes ranging in thickness from about 200 to 10,000 A may be prepared by diluting a concentrated casting dope, of about 10 percent solids, with a low boiling solvent, or mixture of solvents, to form a dope of about 0.5 percent solids, followed by dip-coating onto a suitable support. Suitable solvents include acetone, alcohol, chloroform and dioxane. The film thickness, generally from about 400 to 2000 A, is controlled by removing the immersed support at a specified rate.

Asymmetric membranes may be formed by drying the casting dope on a glass plate to a particular solvent concentration, followed by dipping the coated glass plate into water at a temperature of about 0° to 10°C.

Suitable supports are those conventionally employed in reverse osmosis processes. These include porous glass, sintered metals, ceramics and organic polymeric materials such as cellulose esters, polystyrene, polyvinyl butyral, polysulfone, etc. The supports will generally have thicknesses of about 10 to 200 microns and an average pore size of about 100 to 5000 A. Suitable commercially available support materials include porous polymeric materials such as Millipore filters, which consist of mixtures of cellulose acetate and cellulose nitrate.

The desalination devices in which the membranes of the invention are typically employed are conventional and will not be described in detail in this application. In general, however, such devices include mounting means for positioning the membrane so that a supply of feed solution at the desired pressure can be fed to the surface of the membrane. The devices also include systems for removing the fluid which permeates through the opposite surface of the membrane and a system for removing the feed mixture which has been depleted of the fluid component. The flow rate of the feed mixtures to the device and withdrawal of the depleted mixture are regulated to maintain the desired feed pressure while keeping the boundry layer effect at the surface of the membrane below the desired limit.

Although the semipermeable membranes of the invention have been found to be particularly effective for use in desalination by reverse osmosis, they may also be used in other separation processes such as rejection of phenol from aqueous solution.

The following examples will more particularly illustrate the invention.

EXAMPLES 1-8

These examples illustrate preparation of the N-amido imide polymers. In each example, the procedure consisted of slow addition of a stoichiometric amount of a hydrazide to a solution of a dianhydride in a suitable solvent at 0°C. The solution was stirred for a period of 2 hours to complete the reaction of the hydrazide and the dianhydride to form the amic acid.

Conversion of the amic acid to the imide form was achieved by adding to the amic acid reaction mixture a 50 volume percent mixture of pyridine and acetic anhydride, and allowing the resulting mixture to react, with stirring, for a period of about 30 minutes.

Table 1 gives the hydrazide, the dianhydride, the solvent, the concentration of the dianhydride in the solvent, inherent viscosity of the N-amido imide polymer (determined at 25°C at 0.5% polymer concentration in DMAc.), and the structural formula of the characteristic group of the polymer.

TABLE 1

| Ex. | Monomers | | Conc. (wt. percent) | Reaction solvent | Inherent viscosity (dl./g.) | Structure of polymer |
|---|---|---|---|---|---|---|
| | Dianhydride | Hydrazide | | | | |
| (1) | 3,3′,4,4′-benzophenone | Isophthalic dihydrazide | 18 | DMAc | 1.58 | |
| (2) | do | p-Aminobenzoic hydrazide | 20 | DMAc | 1.26 | |

TABLE 1—Continued

| Ex. | Monomers Dianhydride | Hydrazide | Conc. (wt. percent) | Reaction solvent | Inherent viscosity (dl./g.) | Structure of polymer |
|---|---|---|---|---|---|---|
| (3) | ....do.... | Oxalic dihydrazide | 18 | DMF | 1.02 | —N(phthalimide)—CO—(phthalimide)N—NHCOCONH— |
| (4) | ....do.... | Succinic dihydrazide | 10 | DMSO | 0.85 | —N(phthalimide)—CO—(phthalimide)N—NHCO(CH$_2$)$_2$CONH— |
| (5) | ....do.... | Glutaric dihydrazide | 15 | DMF | 1.41 | —N(phthalimide)—CO—(phthalimide)N—NHCO—(CH$_2$)$_3$—CONH— |
| (6) | ....do.... | Adipic dihydrazide | 18 | DMAc | 1.32 | —N(phthalimide)—CO—(phthalimide)N—NHCO—(CH$_2$)$_4$—CONH— |
| (7) | Pyromellitic | Isophthalic dihydrazide | 18 | DMAc | 0.95 | —N(pyromellitimide)N—NHCO—(phenyl)—CONH— |
| (8) | 1,2,3,4-cyclopentane | ....do.... | 10 | DMAc | 0.68 | —N(cyclopentane-diimide)N—NHCO—(phenyl)—CONH— |

EXAMPLES 9–17

In these examples, films, essentially pinhole and particle free, were prepared by filtering the imide polymer solutions obtained in Examples 1–8, respectively, through 5μ Teflon (polytetrafluorethylene) filters at 450 psi pressure, and casting 50 ml of the solution onto a glass plate using a casting knife with a 10 mil knife gap, to give about 4 square feet of wet film. Prior to casting, the glass plate was cleaned several times with acetone and coated with a thin layer of DMAc.

After casting, the glass plate was covered with a 1 inch high chamber to prevent deposition of dust, and the film was dried by means of heating lamps at 73°C for 1 hour at a humidity level of less than 3 percent (R.M.). After cooling to ambient temperature, the film was stripped from the glass plate, rolled into a Dacron (polyethylene terephthalate) cloth, and dried for an additional hour at 135°C. The resulting films had thicknesses as shown in Table 2, below.

Reverse osmosis properties of the thus-prepared films were tested in an Amicon pressure cell consisting of a stainless steel porous plate with a 3 inch diameter membrane area, a Teflon-lined chamber, a magnetic stirring assembly, an inlet port for gas pressurization and a product water outlet located beneath the porous plate. The films, on a support consisting of No. 40 filter paper, were pressurized to 1500 psi using a 3.5% NaCl feed solution. Water flux and NaCl rejection were measured periodically over a period of 2 days. Results, including those for a 39.8% acetyl cellulose acetate control (Example 17), are given in Table 2. The films of Examples 9–16 correspond to the polymers of Examples 1–8, respectively. Water fluxes in the table are expressed in gal/ft$^2$—day normalized to a thickness of 2000 Å (viz. the approximate thickness of the barrier in an asymmetric cellulose acetate membrane). As seen from the data of the table, the poly(N-amido)imides of Examples 1–8 all exhibit superior water flux and salt rejection, particularly as compared to cellulose triacetate.

Table 2

| Example | Film Thickness ($\mu$) | Water Flux (gal/ft²–day–2000 A) | Rejection (%) |
|---|---|---|---|
| 9  | 28 | 28  | 99.95 |
| 10 | 30 | 18  | 99.29 |
| 11 | 28 | 31  | 98.60 |
| 12 | 20 | 19  | 99.65 |
| 13 | 32 | 22  | 99.20 |
| 14 | 35 | 17  | 98.80 |
| 15 | 24 | 21  | 98.05 |
| 16 | 26 | 23  | 97.30 |
| 17 | 16 | 2.9 | 99.35 |

I claim:

1. In a process for desalination of saline water by reverse osmosis comprising contacting the saline water under pressure with a reverse osmosis membrane, the improvement consisting of using a membrane comprising a film of a poly(N-amido) imide having the recurring group

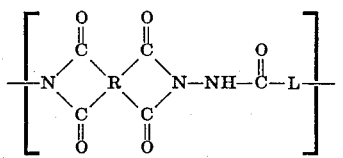

where R is a tetravalent organic radical and L is a divalent organic radical, as the reverse osmosis membrane.

2. The process of claim 1 in which the saline water is sea water.

3. The process of claim 1 in which the recurring group is

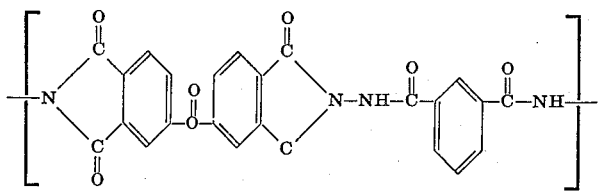

4. The process of claim 1 in which the recurring group is

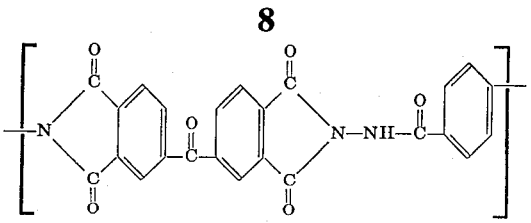

5. The process of claim 1 in which the recurring group is

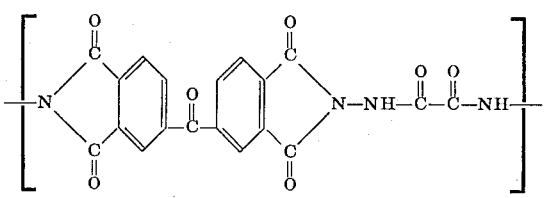

6. The process of claim 1 in which the recurring group is

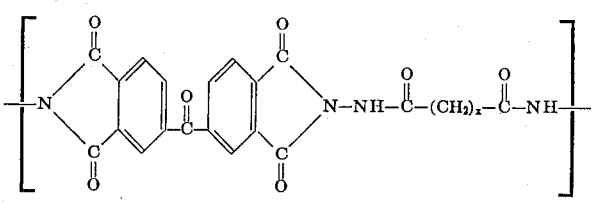

where x is 2 to 4.

7. The process of claim 1 in which the recurring group is

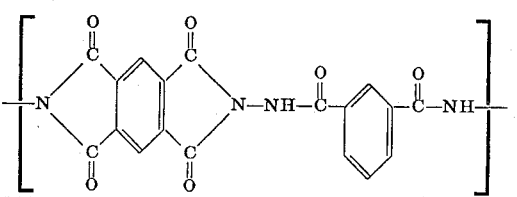

8. The process of claim 1 in which the recurring group is

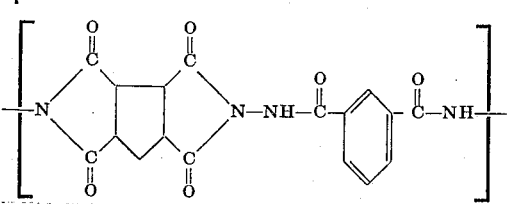

* * * * *